[19] United States Patent
Lazcano-Navarro et al.

[11] Patent Number: 4,726,033
[45] Date of Patent: Feb. 16, 1988

[54] PROCESS TO IMPROVE ELECTRIC ARC FURNACE STEELMAKING BY BOTTOM GAS INJECTION

[76] Inventors: Arturo Lazcano-Navarro; Gregorio Vargas-Gutierrez; Carlos Maroto-Cabrera, all of Salitto, Coahuila, Mexico

[21] Appl. No.: 823,613

[22] Filed: Jan. 29, 1986

[51] Int. Cl.[4] .............................................. F27D 3/16
[52] U.S. Cl. ...................................... 373/71; 373/84; 373/85
[58] Field of Search ...................... 373/60, 71, 72, 73, 373/74, 75, 76, 79, 84, 85, 86; 266/265; 110/173 R, 173 C

[56] References Cited
U.S. PATENT DOCUMENTS 1,818,239  8/1931  Moore ..................................... 373/84
4,308,415 12/1981  Hasegawa et al. ..................... 373/84

Primary Examiner—Roy N. Envall, Jr.
Attorney, Agent, or Firm—Laurence R. Brown

[57] ABSTRACT

A process to improve electric arc furnace steelmaking. The efficiency increase is due to the metal-slag stirring that is produced by bottom gas injection through gas permeable ceramic elements. The permeable elements are not penetrated by the liquid metal, which does not stop the gas flow.

The process is carried out in combination with a furnace charging door stopper device. The device avoids liquid ejections through the furnace charging door during the injection periods. The electric arc furnace steelmaking generalized practices are more effective when the molten metal is being stirred by gas injection, by increasing the metal-slag and the slag-atmosphere interphase area. When the stirring gas is natural gas, the process conditions, oxidizing or reducing, are reinforced according to the slag in the bath.

6 Claims, 3 Drawing Figures

PROCESS TO IMPROVE ELECTRIC ARC FURNACE STEELMAKING BY BOTTOM GAS INJECTION

BACKGROUND OF THE INVENTION

The electric arc furnace is a good melting reactor, but presents certain metallurgical restrictions, mainly regarding the refining of low impurity level steels. These limitations are due to the almost complete absence of agitation of the molten bath. It is known that if the molten bath is stirred, the heat and mass transfer rates are increased to approach faster the equilibrium conditions in the slag-metal-atmosphere system.

In that regard, some plants are using electromagnetic stirring, however, the power agitation with this process is limited.

It has been proposed to stir some metallurgical vessels like converters by bottom gas injection. This practice has certain technological restrictions when used in the electric arc furnace: With common refractory permeable elements used in converters, it is not possible to cut off the gas flow; on the other hand, if the molten bath in the electric arc furnace is strongly stirred, the ejection of molten bath can occur through the furnace charging door.

The main gases used as stirring gas are argon and nitrogen. Natural gas has been used only for the following purposes: copper deoxidation by injection of reformed natural gas; cooling of the oxygen injection tuyeres; and to transport powders in the pig iron desulfuration.

SUMMARY OF THE INVENTION

It is therefore an object of the present invention to provide for a process into the bottom gas injection of molten bath in the electric arc furnace, with the possibility to operate with periods of no gas flow and periods of high gas flow for stirring, without the risk of liquid ejection through the furnace charging door.

It is another object of the present invention to use natural gas as a stirring gas, in sustitution of the inert gases. This practice reinforces the process conditions, oxidizing or reducing, according to the slag in the molten bath as follows:

Oxidizing conditions: The bottom natural gas injection is made in combination with an oxidizing slag. The vigorous stirring increases the metal-slag and the metal-atmosphere interphase area, resulting in greater elimination from the molten metal of the most oxidable elements (C, Mn, Si, P, Al) than that obtained in the conventional practice.

Reducing conditions: The bottom natural gas injection is made in combination with an appropriate reducing slag. The bottom gas stirring increases the metal-slag contact, increasing the sulfur and oxygen transfer from the metal to slag. The natural gas is burned out in the bath surface, consuming the atmosphere's oxygen and increasing the efficiency of the reducing conditions. The sulfur elimination from the molten metal, by this practice, is greater than that obtained by conventional practices.

The natural gas permanence is small enough that the cracking of methane is practically worthless. However, it is possible that a small amount of cracking occurs near the bath surface. This case has two benefits:

It produces a reducing atmosphere ($H_2$), and the carbon deposition produces an additional stirring known as molten metal "boiling".

The injection of gas is accomplished through gas permeable ceramic elements, which are not penetrated by the molten metal even when the gas flow is cut-off. The ceramic permeable elements are installed as plugs in the furnace bottom and their arrangement depends on the number of them to be installed and on the desired flow pattern.

The bottom gas injection is made in combination with a charging door stopper device, which avoids the risk of ejection of matter metal through the furnace charging door.

The above and other objects, features and advantages of the invention will become more readily apparent from the following description, reference being made to the drawings whose sole figures are schematic drawings according the process of the present invention.

DESCRIPTION OF THE PREFERRED EMBODIMENTS

The present invention relates to a process for improving electric arc furnace steelmaking. More particularly, the present invention relates to a method for stirring the molten metal bath in the electric arc furnace, that in combination with appropriate slag and stirring gas improves the electric arc furnace processes. The process improvement is due to the increase of the metal-slag, metal-atmosphere and slag atmosphere interphase that is produced by bottom gas injection in combination with a furnace charging door stopper device. This device permits a vigorous stirring of the metal-slag bath, avoiding ejections of the melts through the furnace charging door. The gas injection is done through gas permeable ceramic elements which are not penetrated by the liquid metal, even upon stopping the gas flow.

Figure 1:
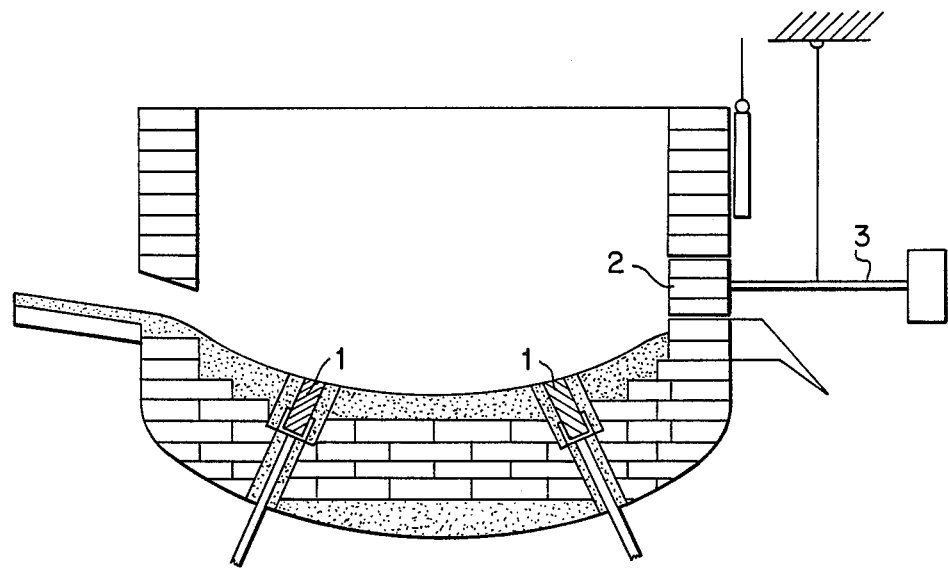
FIG. 1 schematically illustrates a cross section of an electric arc furnace with gas permeable ceramic elements and a charging door stopper device in one arrangement.

Referring to FIG. 1, the gas permeable ceramic elements (1), are installed as plugs in the electric arc furnace bottom and the arrangement on the furnace bottom depends on the number of them to be installed, on the furnace physical configuration and on the desired flow pattern.

Figure 2:
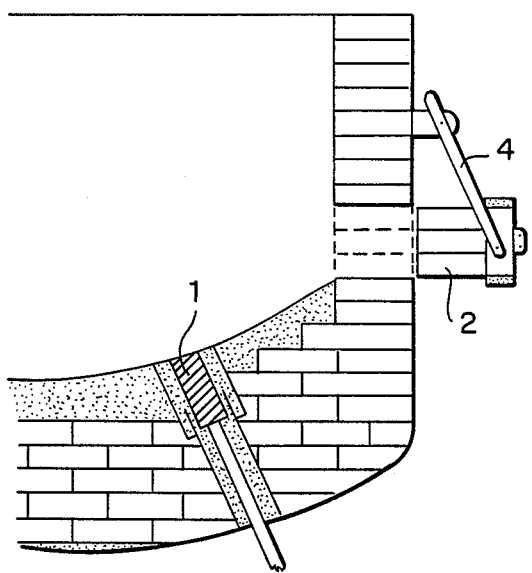
FIGS. 2 and 3 schematically illustrate other embodiments of the charging door stopper device.
Figure 3:
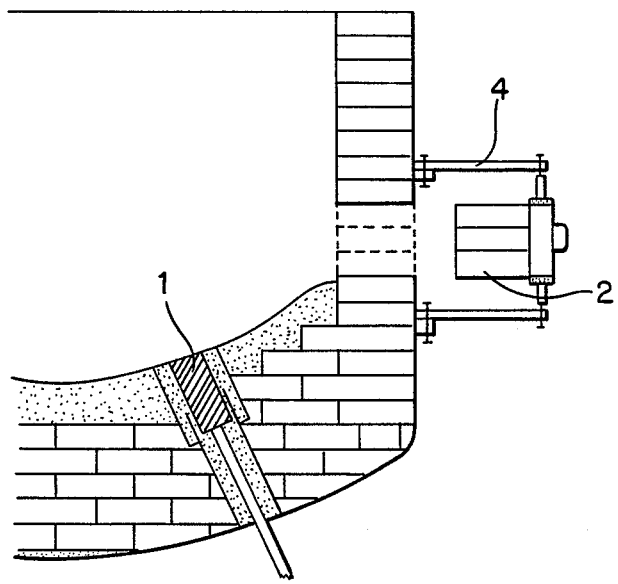

The furnace charging door stopper device consists of a refractory lid (2), of the same dimensions of the charging door orifice. The said refractory lid is mounted on one end of a ram with a counterweight (3), forming a battering ram as a charging door stopper device. In another arrangement, FIG. 2, the refractory lid (2), is mounted on a hinge mechanism (4), which is mounted on the furnace exterior wall, and it operates in a vertical plane or is mounted to operate laterally, FIG. 3, forming a door as a charging door stopper device. The said hinge mechanism (4), could be operated by hand, pneumatically or hydraulically.

The process for molten metal stirring in the electric arc furnace consists of the following steps:
 1. Blockading of the furnace charging door.
 2. Bottom gas injection.
 3. Gas flow suspension and relieving of the blockade.

The stirring gas could be argon, nitrogen or natural gas, the latter being, the only one that reinforces the process conditions, oxidant or reducing, according to the slag in the bath.

The inventors of this invention have carried out studies in the laboratory and in a pilot plant, with a view to finding the natural gas cracking conditions when that gas is bubbled in a molten iron bath. As a result, it has been found that under steel refining conditions, the natural gas cracking is worthless at least when the bath depth is between 0 to 2 meters. When the natural gas flow is increased, the amount of gas cracked is decreased because the smaller residence time of such gas in the molten bath.

The following examples of the present invention are to be applied in the electric arc furnace practices:

EXAMPLE 1

Processes in the Oxidizing Period

The dephosphorization process is carry out according the following steps:

Melting and building up an oxidizing slag by adding fluxes, mineral (FeO) and/or oxygen by lance. The slag basicity index ($CaO/SiO_2$) must be higher than 3. Then, molten metal stirring by the bottom gas injection process, and finally the slagging off process.

The decarburizing process starts by creating oxidizing conditions in the melted bath, then molten metal stirring by the bottom gas injection process, which ends when the carbon content in the metal is about 0.1%. However, it is possible to obtain extra low levels of carbon (0.002% C) only with the bottom gas injection at the end of the oxidant period, with natural gas being the stirring gas.

EXAMPLE 2

Processes in the Reduction Period

The desulfurization process is started after removing the previous oxidizing slag, then building up an appropriate synthetic reducing slag having a basicity index higher than 3, and then molten metal stirring by the bottom gas injection process. The high metal-slag contact that is produced by gas stirring permits the effective sulfur elimination from the molten metal, and gives rise to a greater steel cleanness, less refractory wear, and shorter operation times than the conventional process. The natural gas, when it is used as a stirring gas, is burned out in the bath surface, consuming oxygen from the atmosphere that increases the efficiency of the reducing conditions. It is possible to obtain extra low sulfur levels (0.002% S) when the stirring gas is natural gas.

EXAMPLE 3

Adjustment Period

This practice starts with the addition of alloys, after the molten bath deoxidation process and sampling, then molten metal stirring by the bottom gas injection process, then sampling and chemical analysis and if necessary alloy adjustment, followed by molten metal stirring by the bottom gas injection process.

The stirring of the molten metal by bottom gas injection produces a greater and faster thermal and chemical homogenization of the molten metal than the conventional process, and permits a greater quality control and reduction of the operation time. When the stirring gas is natural gas, it protects the additions against atmospheric oxidation by consuming oxygen from the atmosphere, burning it out in the bath surface.

Although the present invention has been described, it is to be understood that modifications and variations may be resorted to, without departing from the spirit of the invention. Such modifications and variations are considered to be within the scope of the present invention as defined by the appended claims.

What is claimed as new and desired to be protected by Letters Patent is set forth in the appended claims:

1. In an electric arc furnace steelmaking process of melting and refining of steels with low levels of impurities, the improvement which comprises the steps of: providing a plurality of gas permeable ceramic elements which are installed on the furnace bottom in an electric arc furnace; stirring the molten metal in the furnace by blowing a gas through the ceramic elements and into the interior of the molten metal in the furnace; and blocking the furnace charging door opening by a stopper that includes a refractory lid of the same dimensions as the charging door opening in such way that the internal furnace wall maintains its continuity in the door zone to avoid liquid ejection through the furnace charging door opening as the molten metal is being stirred.

2. A process as defined in claim 1, wherein the stirring gas is selected from the group consisting of argon, nitrogen, and natural gas.

3. A process as defined in claim 1, including the step of forming a synthetic oxidizing slag having a basicity index ($CaO/SiO_2$) higher than 3 prior to stirring the molten metal to eliminate phosphorus therefrom.

4. A process as defined in claim 1, including the step of forming a synthetic reducing slag having a basicity index higher than 3 prior to stirring the molten metal to eliminate sulfur therefrom.

5. A process as defined in claim 1 including the step of creating an oxidizing condition in the molten metal prior to stirring the molten metal to reduce the carbon content thereof.

6. A process as defined in claim 1, including the step of adding alloying materials to the molten metal prior to stirring to reduce the thermal and chemical homogeneization time of the molten metal in the electric arc furnace.

* * * * *